Oct. 24, 1961 E. W. GRANT 3,005,957

CURRENT AMPLIFIER FOR LOW IMPEDANCE OUTPUTS

Filed Feb. 29, 1960

INVENTOR.
EARL W. GRANT

BY Philip Sublow

ATTORNEY.

United States Patent Office 3,005,957

Patented Oct. 24, 1961

3,005,957

CURRENT AMPLIFIER FOR LOW IMPEDANCE OUTPUTS

Earl W. Grant, Los Angeles, Calif., assignor to Statham Instruments, Inc., Los Angeles, Calif., a corporation of California Filed Feb. 29, 1960, Ser. No. 11,847
2 Claims. (Cl. 330—19)

This invention relates to an amplifier which amplifies an input signal to produce an output signal of larger current with no substantial increase in the voltage and with no substantial reduction in the voltage, and constitutes a continuation-in-part of application Serial No. 744,760, filed June 26, 1958.

I have thus been able to produce an amplifier which will amplify the current of a D.C. or A.C. signal, linearly and without substantial distortion of the input signal and with substantially no change in the voltage amplitude and which has a high gain in the current amplitude; that is, the current amplifier is one with a low impedance output.

The system of my invention employs an impedance bridge, including in one leg of the bridge a diode operating in the Zener region, and in the opposite leg of the bridge a transistor, connected as an emitter follower, i.e., as an impedance reducing stage rather than as a voltage amplifying stage. The other legs of the bridge may be resistances or like load or voltage proportioning elements.

When such a bridge is balanced no signal appears at the output of the bridge. However, when the bridge is unbalanced by the imposition of a signal to the base of the transistor, it causes the bridge to be upset and a signal to appear at the output of the bridge. The output voltage will be substantially that of the signal voltage, perhaps somewhat less but not amplified, while the current flow, depending of course on the value of the load resistance and the voltage at the input and impedances in the bridge, will be amplified with a large gain factor.

Figure 1:
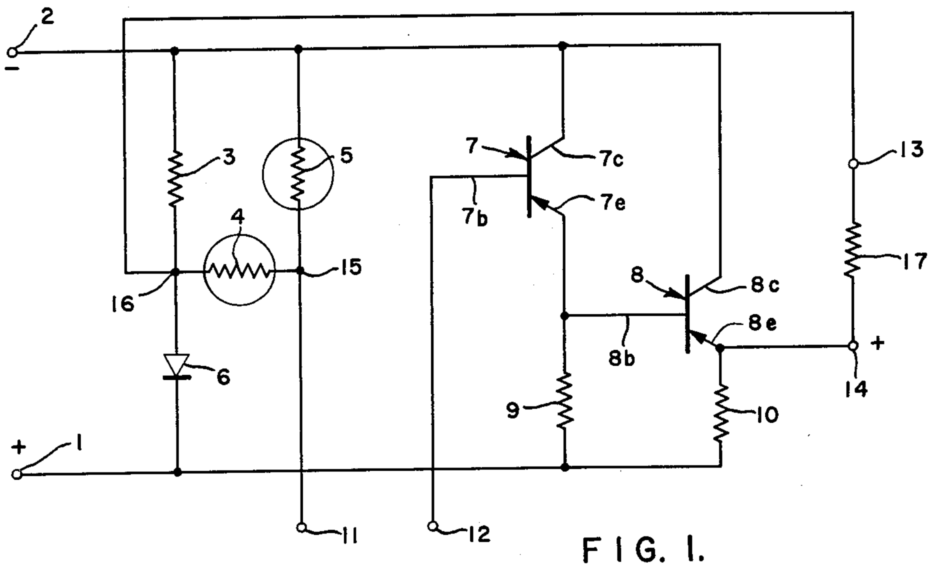
Figure 2:
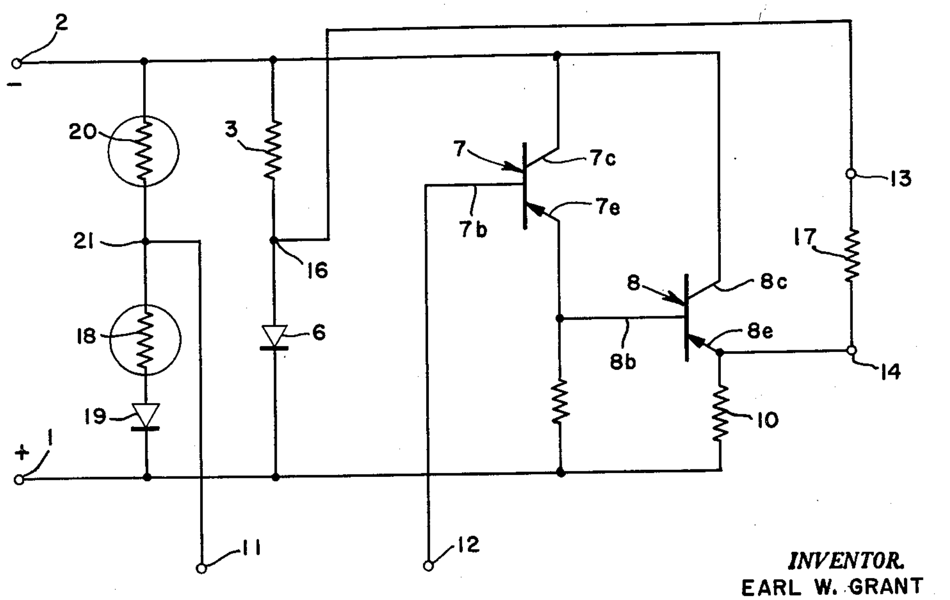

These and other objects of my invention will be further described in connection with the drawing, in which FIG. 1 is a schematic diagram of the current amplifier of my invention; and FIG. 2 is a modification of the current amplifier of FIG. 1.

In the diagram FIG. 1, the D.C. power input is shown as positive pole at 1 and negative at 2. One arm of the impedance bridge is composed of the voltage divider composed of the resistance network formed of resistance 3 shunted by the series resistances 4 and 5. Any other resistance arrangement which will control the bias at 15 may be employed. The adjacent leg of the bridge is formed of the Zener diode 6. The diode is of the semiconducting type operated at a potential in the Zener region. The two opposite legs of the bridge are composed of transistors 7 and 8 arranged in cascade as emitter followers or impedance reducing stages, in which the emitter resistors 9 and 10 are connected to the emitters *7e* and *8e* of the p-n-p transistors 7 and 8 respectively, the emitter electrode *7e* being connected to the base *8b*. By proper choice of the resistances 3, 4, 5, 9 and 10 to compensate for the impedance of the diode 6 and transistors 7 and 8, the bridge may be balanced so that no output occurs across the corners of the bridge at the output connections 13 and 14, when no signal is impressed at 11 and 12. In other words, the potential across the Zener diode 6 is then equal to that across the emitter resistor 10.

However, if the conductivity of the transistors is modified by applying at 11 and 12 a D.C. signal or a signal having a D.C. component, to the base *7b*, the bridge becomes unbalanced. A signal appears at 13 and 14. If the potential between 11 and 12 is small in comparison with that between 1 and 2, the bridge will be unbalanced by the applied voltage between 15 and *7b*, and a similar voltage difference will appear at 13 and 14; however, the current flow will depend on the magnitude of the load 17 connected to the output connections at 13 and 14. The voltage impressed when signal occurs should flow as indicated employing the convention that flow is from positive to negative, remembering that when the diode 6 operates in the Zener region the flow of current is in a direction opposite to its polarization at potentials in the region below the Zener region.

To illustrate my invention, but without limiting the same to the values employed, the following will indicate results obtainable with my invention: Employing about 25 volts rectified D.C. input at 1 and 2 and applying 1.18 volts and $25\times10^{-6}$ amps. at 11 and 12, an output of 75 milliamps is obtained at 13 and 14 with a 15 ohm load at 17 and an output of 40 milliamps with a 64 ohm load resistor at 17.

The voltage distribution is illustrated by the following example: With 16.5 volts across resistor 5 and 8.5 volts across the diode 6, a voltage of 9.8 volts was obtained across the resistor 9 and 9.3 volts across the resistor 10, at a signal at 11 and 12 of voltage of 1.18 volts and $25\times10^{-6}$ amps. The voltage obtained at the output 13 and 14 across resistor 17 was 1.02 with a current of $72\times10^{-3}$ amps.

While the bridge of FIG. 1 is adequate and stable under substantially constant environmental conditions, improved temperature stability may be obtained by the circuit of FIG. 2, which is electrically equivalent for the purposes of this invention to that of FIG. 1 with the addition of the improved temperature stability referred to above. For large environmental temperature changes, the resistance of 4 and 5 in the circuit of FIG. 1, as a function of temperature, introduced a variation of potential at point 15; and temperature compensation of the resistances 4 and 5 by adjusting their relative temperature coefficient with respect to the rest of the circuit is insufficient to stabilize the potential at 15 where temperature variations are too large. In the circuit of FIG. 2, the resistances 4 and 5 of FIG. 1 are omitted and, instead, series resistances 20 and 18 are placed in series with a Zener diode 19 across the D.C. power input 1 and 2. The pole 11 on the signal input of the bridge is connected between 20 and 18 in FIG. 2 instead of to 15 as in FIG. 1. The rest of the circuit is the same as that shown in FIG. 1.

By this means I am able to control the voltage existing across the resistance 18 and the diode 19 as a function of temperature.

Diodes of the Zener type have a temperature coefficient which depends upon the potential at which they operate. For any given type of Zener diode, there is one potential at which the temperature coefficient of its resistance is zero. Thus, for example, a silicon Zener diode will operate at zero temperature coefficient at a potential of about 5 volts. Below this potential the diode has a negative temperature coefficient of resistance, and above this potential it has a positive temperature coefficient of resistance. I select a diode for diode 19 with such a temperature coefficient at the potential established across it in circuit FIG. 2 at its operating point such that, in combination with resistances 18 and 20, a zero current will flow in the leg composed of 20, 18 and 19, and provide the correct amount of temperature compensation for the rest of the circuit. Thus, diode 19 is selected to have such a coefficient at its operating potential in the circuit to compensate or be opposite in sign and amount to the temperature coefficient of the rest of the circuit. If, in selecting a diode, it is found that the voltage drop across the diode is insufficient in order to establish the proper potential at point 21, the resistance element 18 is made to be of the desired magnitude so that the point 21 will be at the desired potential for biasing the amplifier to establish the desired potential at point 21.

In order to assist in this function, the resistances 18 or 20 are chosen to be of a temperature sensitive material, i.e., one whose resistance changes with temperature in such an amount and in such direction as to regulate the action of the Zener diode 19. Thus, if the Zener diode 19 has a temperature coefficient of resistance which is greater in either direction than the temperature coefficient of resistance of the rest of the system, the resistance 18 or resistance 20 are chosen to be of opposite sign, so as to compensate for the variation caused by the Zener diode 19, to establish as low a sensitivity to temperature of the system as is conveniently possible. Thus, if the temperature coefficient of resistance of the Zener diode 19 is insufficiently great to compensate for the temperature variations in the rest of the system, then the resistances 18 or 20 are chosen to have a temperature coefficient of resistance which is in the same direction as that of the diode 19 and thus, by adding to the variation in the Zener diode, to apply the necessary compensation to establish substantially invariant resistance conditions in the system to make the output substantially constant for a given signal input, irrespective of temperature.

It will be recognized that both points 21 and 16, in FIG. 2, and 15, in FIG. 1, can each be considered as signal ground for the dynamic operation of the amplifier; and the two circuits, FIG. 1 and FIG. 2, are electrically equivalent insofar as the signal input points at 15 and 21 and the signal output points 16 in each circuit, FIG. 1 and FIG. 2, are concerned. The system in FIG. 2 thus adds to the system in FIG. 1 by establishing a temperature compensating bridge balancing unit composed of a series resistance and a Zener diode having a temperature coefficient of resistance opposite to that of the rest of the circuit to obtain substantially the same signal output for a given signal input and power potential irrespective of temperature variations of the circuit elements.

While I have described a particular embodiment of my invention for purposes of illustration, it should be understood that various modifications and adapations thereof may be made within the spirit of the invention as set forth in the appended claims.

I claim:

1. A current amplifier comprising power input terminals, a resistance diode network connected to said power input terminals, said network including in series a pair of resistors and a Zener diode in series, a signal input terminal coupled to said network at a point between said first-named resistors, a second resistance diode network including in series a resistance and a Zener diode coupled to said power input terminals, an output terminal for said amplifier coupled to said second network at a point between said resistance and said diode of said second network, a pair of transistors in cascade each having a collector, emitter and base electrode, a signal input terminal coupled to the base of one of said transistors and an output terminal coupled to the emitter of the second transistor, and the emitter of said first transistor coupled to the base of the second transistor, the collectors of said transistors coupled to one of said power terminals and the emitters of said transistor coupled to the other of said power terminals through individual resistances.

2. In the circuit of claim 1, said first-named resistors of said first-named network being temperature sensitive to compensate for the changes of resistance with temperature of the Zener diode of said network.

References Cited in the file of this patent

UNITED STATES PATENTS

| | | |
|---|---|---|
| 2,751,545 | Chase | June 19, 1956 |
| 2,751,550 | Chase | June 19, 1956 |